United States Patent
Sinnhuber et al.

[19]

[11] Patent Number: 6,062,642
[45] Date of Patent: May 16, 2000

[54] VEHICLE SEAT

[75] Inventors: Ruprecht Sinnhuber, Gifhorn; Tim-Bosse Vogel, Ulm; Thomas Wohllebe, Braunschweig, all of Germany

[73] Assignee: Volkswagen AG, Wolfsburg, Germany

[21] Appl. No.: 09/054,023

[22] Filed: Apr. 2, 1998

[51] Int. Cl.[7] .................................................... B60N 2/42
[52] U.S. Cl. ............................... 297/216.13; 297/216.1; 297/216.14
[58] Field of Search ......................... 297/216.12, 216.13, 297/452.5, 452.52, 216.1

[56] References Cited

U.S. PATENT DOCUMENTS

| | | | |
|---|---|---|---|
| 2,608,243 | 8/1952 | Kostrowski | 297/452.5 X |
| 2,836,226 | 5/1958 | Fridolph | 297/452.5 |
| 4,368,917 | 1/1983 | Urai | 297/452.54 |
| 5,253,924 | 10/1993 | Glance | 297/216.13 X |
| 5,310,247 | 5/1994 | Fujimori et al. | 297/378 |
| 5,378,043 | 1/1995 | Viano et al. | 297/216.12 X |
| 5,769,489 | 6/1998 | Dellanno | 297/216.12 X |

FOREIGN PATENT DOCUMENTS

| | | |
|---|---|---|
| 0754590 | 1/1997 | European Pat. Off. . |
| 1470423 | 2/1967 | France ................. 297/452.5 |
| 2263931 | 7/1973 | Germany ............. 297/452.5 |
| 91036119 | 9/1991 | Germany . |
| 4031285 | 4/1992 | Germany . |
| 92152546 | 8/1993 | Germany . |
| 4238549 | 5/1994 | Germany . |
| 4337019 | 5/1995 | Germany . |
| 4421946 | 6/1995 | Germany . |
| 29610078 | 11/1996 | Germany . |
| 9511818 | 5/1995 | WIPO . |
| 9748570 | 12/1997 | WIPO . |

*Primary Examiner*—Peter R. Brown
*Attorney, Agent, or Firm*—Baker Botts, L.L.P.

[57] ABSTRACT

In the embodiment described in the specification, a vehicle seat has a framework arrangement with both backrests and seat parts on which a cushion is mounted. The framework arrangement includes a first framework and a second framework which can be displaced relative to the first framework. To reduce the risk of injury to a vehicle seat occupant in the event of rear-impact accidents and/or accidents involving a vehicle turning over, the second framework is supported from the first framework by an energy-absorption structure.

27 Claims, 3 Drawing Sheets

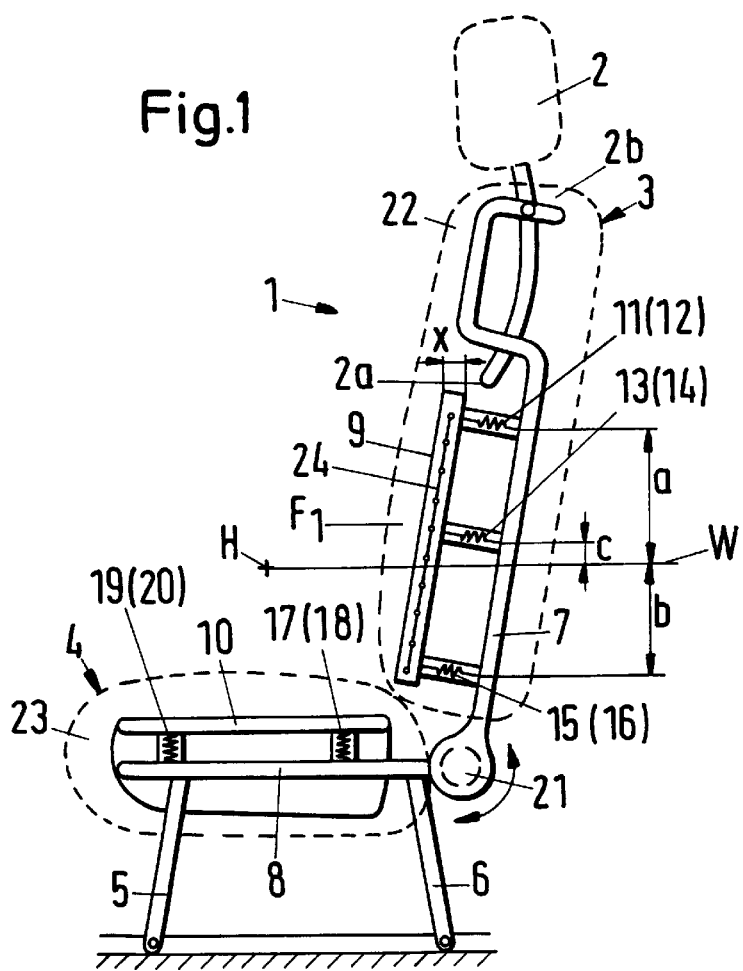
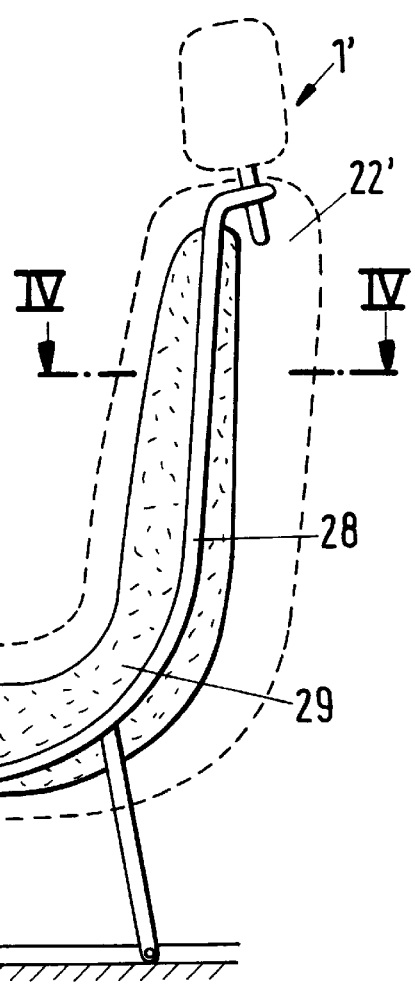
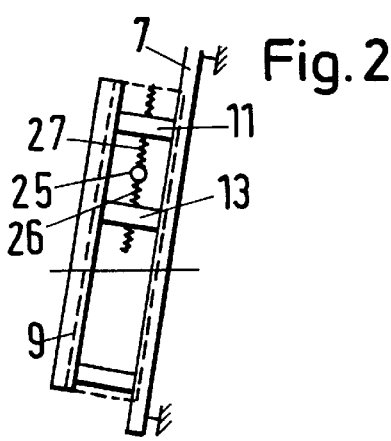

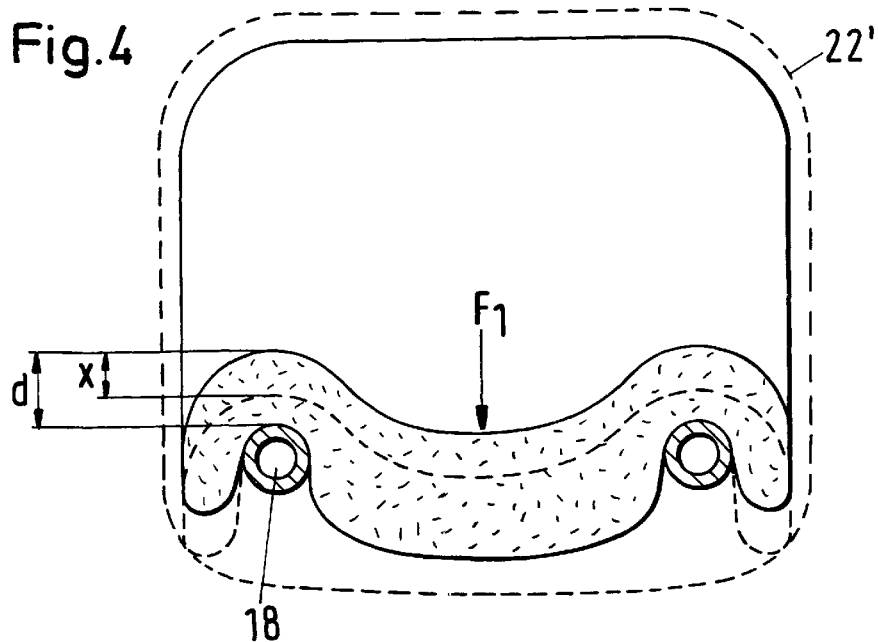
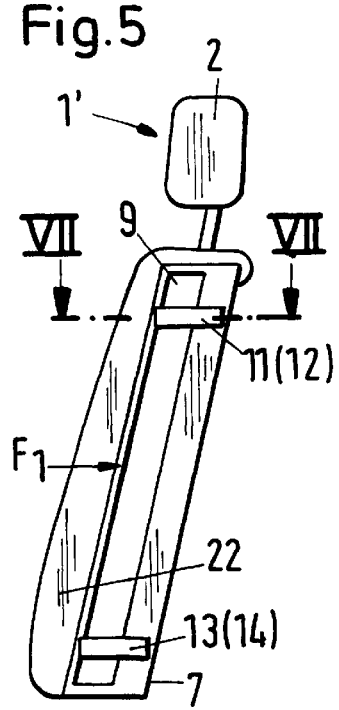
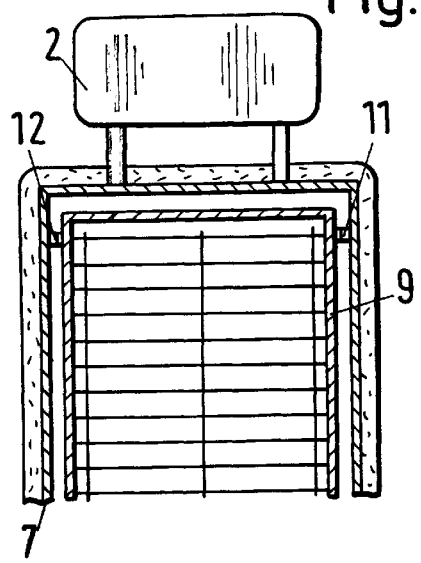
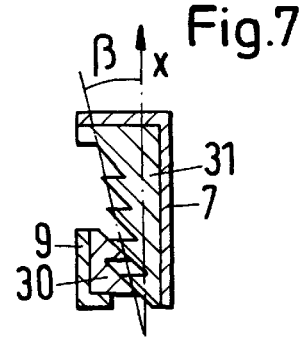
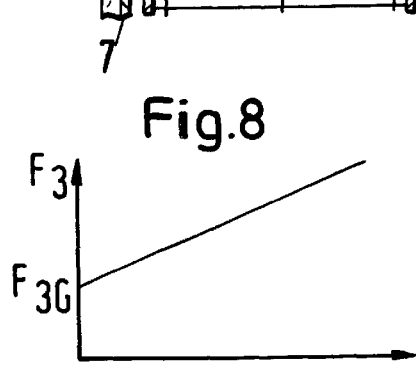

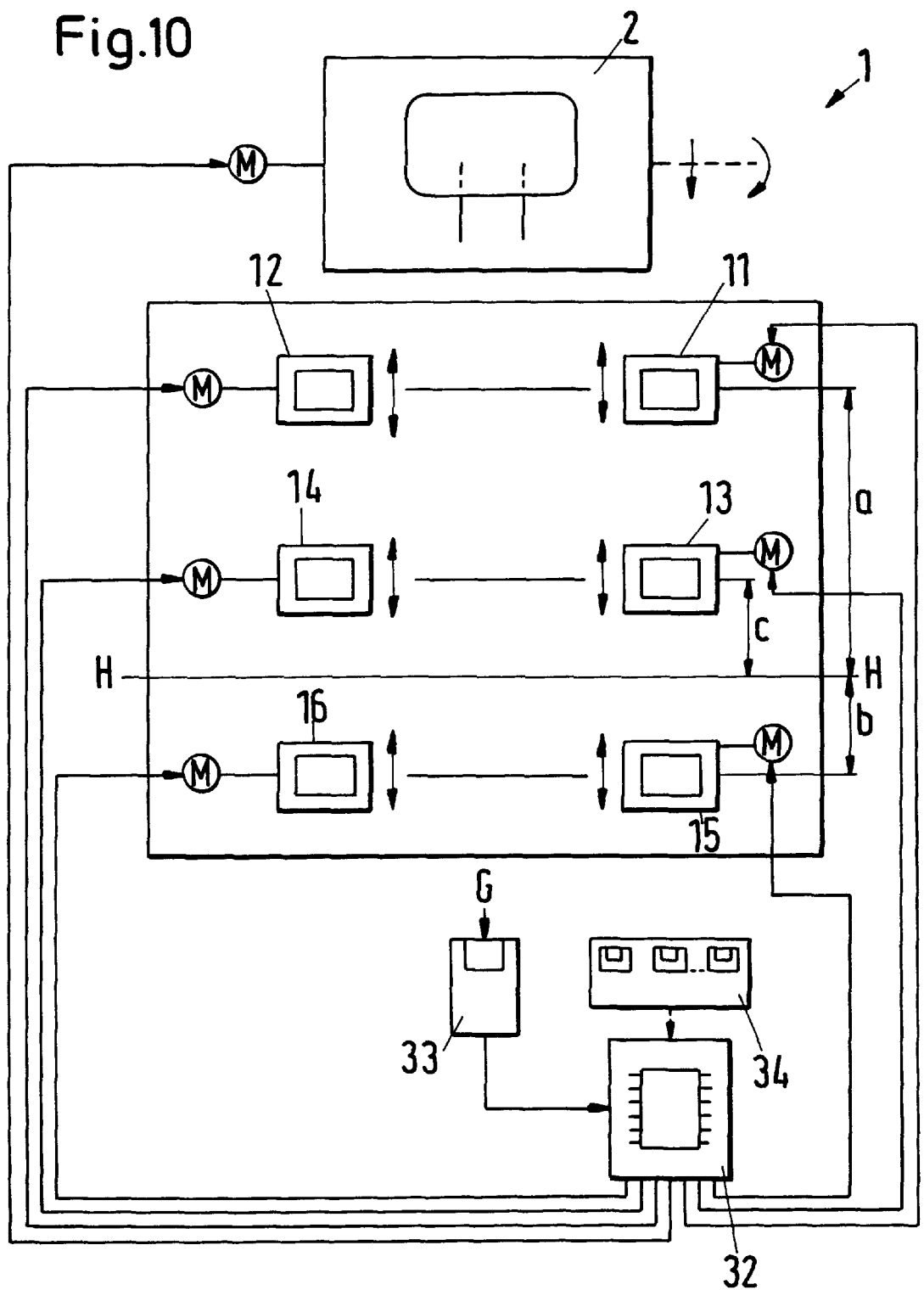

VEHICLE SEAT

BACKGROUND OF THE INVENTION

This invention relates to vehicle seats having a basic support frame and an additional frame supported by the basic support frame. German Offenlegungsschrift No. 44 21 946 and Published International Application No. WO 95/11 818 describe in detail the hazards to which vehicle occupants are exposed in the event of a rear impact.

To reduce the risk of injury to passengers, German Offenlegungsschrift No. 44 21 946 discloses a seat having cross-connections within a backrest framework which can be deformed in their longitudinal direction in an energy-absorbing manner. This arrangement is intended to permit the occupant of the seat to plunge into the backrest by a predetermined amount in the event of a rear impact. The disadvantage of this arrangement, however, is that the permissible plunging movement is restricted to the pelvic region of the occupant. There is no comparable arrangement for the occupant's shoulder region. This problem is addressed in the PTO published application No. WO 95/11 818. In this arrangement, cross-strips are provided which are designed as breaking elements to break when a predetermined force is exceeded, producing a cushion spring arrangement which can be elastically displaced rearwardly. The seat occupant can thus plunge in the direction of the backrest in both the pelvic region and the shoulder region. In addition, this document describes a support element supporting the cushion spring arrangement that can be pivoted as a function of signals from a crash sensor about an axis extending at pelvis height so that backward displacement of the vehicle occupant relative to the backrest frame causes the occupant's head to be guided onto the head restraint. Sudden release of the support element, however, results in an increased impact load in the shoulder region of the vehicle occupant.

German Patent No. 42 38 549 describes a backrest frame with backrest side parts which have an energy-absorbing construction. No protective measures for the shoulder and/or pelvic region are provided.

German Gebrauchsmuster No. 91 03 611.9 shows a seat arrangement having a seat support which is mounted by a spring mounting in a floating manner in a seat framework. The floating mounting is arranged so that, for normal driving operations, the driver is comfortably accommodated in the most diverse terrain conditions.

German Gebrauchsmuster No. 92 15 254 shows a seat framework having floor-mounted legs of energy-absorbing construction. When the seat is subjected to a load, it tips forward.

SUMMARY OF THE INVENTION

Accordingly, it is an object of the present invention to provide a vehicle seat which overcomes disadvantages of the prior art.

Another object of the invention is to provide a vehicle seat in which the risk of injury in the event of rear-impact accidents is reduced.

These and other objects of the invention are attained by providing a vehicle seat having a framework arrangement which includes a basic framework and an additional framework arranged so that the additional framework is supported from the basic framework by an energy absorbing structure. As a result, when the invention is applied to a backrest, the pelvic and upper-torso region of the vehicle seat occupant can be displaceably supported over the entire bearing surface. The invention is not restricted to backrests but may also be used in seat parts so as to be able, for example in the event of a rollover, to limit the compressive loading on the spinal column of a seat occupant to a predetermined extent.

In preferred embodiments of the invention, the energy-absorption structure has occupant-specific force-travel characteristics. The energy-absorption structure may thus, for example, be designed so that a stiffer force-travel characteristic is provided for heavier vehicle occupants than for lighter occupants. Moreover, it is also possible for the energy-absorption ability of the structure to be of differing strength at different places in the framework arrangement so as to impose a desirable rotary motion to the upper torso of the vehicle occupant after a rear impact. This rotary motion may, for example, be optimized along with the head restraint located on the backrest, so that the overall result is an ergonomically favorable support profile for the occupant.

In one embodiment a framework arrangement which is particularly lightweight and simple to install is obtained by molding energy-absorbing elements integrally into the basic framework and/or into the additional framework. This is particularly desirable if, for example, the additional framework is designed as a shell body for the back and/or the bottom and thighs, thus producing a "floating mounting" of the additional framework in the basic framework. In this case, the "floatability" of the additional framework relates only to those loads which are exerted on the framework arrangement during a vehicle accident. In contrast to the arrangement shown in Gebrauchsmuster No. 91 03 611.9, the energy-absorbing structure is arranged so that, in normal seat operation, because of the weight forces exerted by the occupants, no detectable relative movement between the additional framework and basic framework is produced. When shell bodies made of rigid cellular materials, such as polypropylene particle foam or aluminum honeycomb structures are used, the energy-absorbing function may be partially or completely incorporated into the material of the shell body.

A particular advantage of the invention is that it does not take up any additional constructional space in its spatial extent and hence can be used without any loss in comfort in vehicles which are commercially available today. Moreover, it is possible for existing seat frames to be structurally adapted in order to receive the additional framework.

So-called integrated-belt seats are to be regarded as a preferred case for application of the invention. The basic framework of such seats has to absorb the belt forces, when acting as a restraint, and therefore must be of particularly rigid design. Solid frames of this type are particularly critical for the seat occupant in the event of rear-impact accidents and therefore should be provided with an energy-absorbing additional framework.

BRIEF DESCRIPTION OF THE DRAWINGS

Further objects and advantages of the invention will be apparent from a reading of the following description in conjunction with the accompanying drawings, in which:

FIG. 1 is a side view illustrating a representative embodiment of a vehicle seat according to the invention;

FIG. 2 is a sectional illustration showing a modification of the vehicle seat according to FIG. 1;

FIG. 3 is a side view illustrating a further exemplary embodiment of a vehicle seat according to the invention;

FIG. 4 is a horizontal cross-sectional view taken on the line IV—IV of FIG. 3 and looking in the direction of the arrows;

FIG. 5 is a side view showing an arrangement of energy-absorption elements within a backrest;

FIG. 6 is a front view of the backrest illustrated in FIG. 5;

FIG. 7 is a fragmentary sectional illustration in plan view of an energy-absorption element taken on the line VII—VII of FIG. 5;

FIG. 8 is a graphical illustration showing an idealized representative force-travel characteristic for one of the energy-absorbing elements;

FIG. 9 is a view similar to FIG. 7 showing forces acting on the framework arrangement of the seat; and FIG. 10 is a schematic block diagram showing a vehicle seat according to the invention which is capable of providing energy-absorption ratios which are specific to the seat occupant.

DESCRIPTION OF PREFERRED EMBODIMENTS

In all of the figures identical components have the same reference number.

In the typical embodiment of the invention shown in FIG. 1, a vehicle seat has a conventional head restraint 2, along with a backrest part 3, a seat part 4 and legs 5 and 6 which are movable in floor rails and can be locked therein to the vehicle body. The framework arrangement of the vehicle seat 1 comprises two basic frameworks 7 and 8 for the backrest part 3 and the seat part 4, respectively, on which additional frameworks 9 and 10, respectively, are supported by an array of plastically deformable energy-absorbing structures 11 to 20. Those energy-absorbing structures which are on the opposite side of the seat and therefore are not visible in FIG. 1 have reference numbers shown in parentheses in FIG. 1. The basic backrest framework 7 can be pivoted relative to the basic seat part framework 8 by a rotary fitting 21 for the purpose of adjusting the inclination of the backrest part 3.

The so-called hip point, which is important as a reference point in the construction of the vehicle seats, is represented by H in FIG. 1. This point is based on the hip location of a so-called 95$^{th}$ percentile adult male. The energy-absorption elements 11–16 can be positioned with reference to this hip point in designing the vehicle seat 1 according to the invention. For this purpose, the centers of the energy-absorption elements 11–16 are spaced from a horizontal plane W extending through the hip point H by distances represented by the letters a, b and c, in FIG. 1.

The entire framework arrangements described above are concealed beneath a backrest cushion 22 and a seat cushion 23 which are represented in FIG. 1 by dashed lines. A further cushion spring arrangement 24, which is conventional, is provided within the additional framework 9.

In the event of a rear impact, for example, the additional framework 9 is driven toward a vehicle seat occupant (not illustrated) and consequently is subjected to an impact force indicated by $F_1$ in FIG. 1. The energy-absorbing structures 11–16 are designed so that the additional framework 9 can be displaced relative to the basic framework 7 by a predetermined distance x. In this case, the energy-absorbing structures also have a force-limiting function so that the reaction force exerted on the seat occupant cannot exceed a selected maximum value which is to be determined by specific crash scenarios. The displacement of the additional framework 9 toward the basic framework 7, moreover, causes the occupant's head to be guided nearer to the head restraint 2. Absorption of the impact force $F_1$ over a large area is important in this connection in order to keep the overall size of the energy-absorbing structure within limits and also, on the other hand, to be able to reduce the peak loads to which the occupant's body is subjected by locally impacting seat parts. For this purpose, the additional framework 9 covers at least 60% of the area over which the basic framework 7 extends. Particularly good results are obtained when the additional framework covers more than 90% of the basic framework area.

Vehicle seats utilizing the invention provide an equally positive effect both in impact incidents having relatively low impact loads, i.e., accidents at low vehicle speeds, and those at relatively high impact loads, i.e., accidents at high vehicle speeds. In the low impact case, there is sufficient deformation travel in the seat, preferably 10–25 cm depending on the design, to protect the occupant effectively from so-called "whiplash". In the second case, the occupant is guided relatively gently onto the rigid basic framework 9 so as to be caught over a large area and with reduced shear load in the spinal column, in particular in the head/shoulder region, by the entire framework arrangement, including the head restraint 2.

According to a particularly advantageous embodiment of the invention, different force-travel characteristics are provided for the individual energy-absorbing structures in order to be able to set quite specific displacement characteristics depending on the size of the seat occupant and/or on the weight of the occupant.

FIG. 2 shows an exemplary embodiment in which, for example, using an actuator 25, which is indicated only schematically, the energy-absorbing structures 11 and 13 can be adjusted by corresponding spindle drives 26 and 27 so that the distances a and c can be adapted optimally to the seat occupant's body size. The arrangement is selected so that the actuator 25 is fastened, for example, to the basic framework 7 and the energy-absorbing structures 11 and 13 can be moved in slotted guides, indicated by dashed lines, to the desired positions.

FIG. 3 shows a vehicle seat 1' having a basic framework 28 which supports both the backrest and the occupant's seat. In this case the additional framework is a shell body 29 which preferably has a rigid cellular structure such as an aluminum honeycomb or polymeric particle foam having energy-absorbing properties and which also provides sufficient dimensional stability for the normal seat use. Suitable polymeric particle foams may be polypropylene and polyethylene foams having a density in the range from 50–90 grams per liter. The framework arrangement, comprising the basic framework 28 and the additional framework 29, is enclosed by a seat-cushion arrangement 22'. The material composition of the shell body 29 is selected so that plastic deformation produced by the force $F_1$ causes the original thickness d, shown in FIG. 4, to be reduced by the amount x so that the result is a displacement of the backrest surface relative to the basic framework 28. This displacement is indicated diagrammatically in FIG. 4 by thick dashed lines.

FIGS. 5 and 6 show a vehicle seat 1' having a four-point mounting of the additional framework 9 on the basic framework 7 by energy-absorbing structures 11–14 which include a latching tooth arrangement shown in FIG. 7. The latching tooth arrangement has a latch member 30 which is mounted on the additional framework 9 and projects into a mating latching member 31 mounted on the basic framework 7. In the illustrated arrangement, the force $F_1$ is apportioned uniformly so that a force $F_1/4$ acts on each of the four latching elements 11–14. The tooth angle α of the latch members 30 and 31 shown in FIG. 9, produces a force component $F_2$ corresponding to the formula $F_2 = F_1 \tan \alpha$. The force $F_2$ is similarly apportioned uniformly between the two latch members 30 and 31 of each structure. The rigidity of the basic framework 7 and of the additional framework 9 resists the forces $F_2$ and $F_1$ up to a certain minimum force $F_{3G}$. When this minimum force limit is exceeded, the additional framework 9 having the latch member 30 moves relative to the mating latch member 31 of the basic framework 7 in an energy-absorbing manner. In the exemplary embodiment illustrated in the drawing, the inclined surfaces of the profile of the mating latch member 31 are tilted relative to the direction of the displacement x by the angle β in order to obtain a preferably linear increase in the reaction force $F_3$ as the displacement of the additional framework 9 toward the basic framework 7 progresses.

It is not mandatory for the energy absorption in the region of the energy-absorbing structures 11–14 to result from plastic deformation of the latch members 30 and 31. It is also possible for the latch members to remain dimensionally stable and consequently to be wedged by the force $F_1$ between the basic framework 7 and the additional framework 9. This wedging then causes a change in shape to occur in at least one of the frameworks. Such changes in shape which result from framework deformation are defined in terms of construction so that a certain force-travel characteristic between the frames is obtained. In this case, the energy-absorbing structures may be integral components of the basic framework 7 and the additional framework 9.

FIG. 10 shows a plurality of actuators M, indicated diagrammatically, for the vehicle seat 1, by which the positions of the head restraint 2 and of the energy-absorbing structures 11–16 can be changed. For this purpose, the energy-absorbing structures can be controlled by a control unit 32 which may, for example, be connected to a weight sensor 33 and optionally further sensors in sensor system 34. The sensors in the sensor system may include occupant-space monitoring sensors, backrest-inclination sensors, vehicle-overturning sensors or the like. In a preferred exemplary embodiment, a characteristic sensor response diagram is stored in the control unit 32 so that, following an accident situation detected by the sensor system 34 and/or following an indication by the weight sensor 33, a rotation and/or shifting displacement of the head restraint is produced in accordance with the sensed conditions.

It is also possible for displacements of the head restraint to be produced without actuation by an auxiliary force by using the displacement of the occupant to provide actuating forces. To this end, for example, a head-restraint mounting 2a (see FIG. 1) affixed to the basic framework 7 as shown in FIG. 1 is acted upon at its lower end by an impact of the body of the occupant or by motion of the additional framework toward the basic framework so that the head restraint mounting is pivoted forwardly about a point 2b, which is diagrammatically indicated in FIG. 1.

Although the invention has been described herein with reference to specific embodiments, many modifications and variations therein will readily occur to those skilled in the art. Accordingly, all such variations and modifications are included within the intended scope of the invention.

We claim:

1. A vehicle seat comprising a seat part and a backrest part each of the seat part and backrest part having a primary support structure and a cushion covering the primary support structure, the primary support structure of the backrest part being connected at a lower end to a rear end of the primary support structure of the seat part, the primary support structure for the backrest part having an associated auxiliary support structure spaced from it on a side facing a seated passenger constituting a backrest frame containing a cushion spring arrangement, and at least one energy absorbing structure connecting the associated auxiliary support structure with the primary support structure for the backrest part, the energy-absorbing structure being plastically deformable by action of forces resulting from an impact to reduce the spacing between the primary support structure and the auxiliary support structure.

2. A vehicle seat according to claim 1 wherein each primary support structure is a frame for the corresponding part of the vehicle seat.

3. A vehicle seat according to claim 1 including an auxiliary support structure constituting a frame for the vehicle seat part.

4. A vehicle seat according to claim 1 wherein the energy-absorbing structure includes at least one energy-absorbing element integrally molded into at least one of the primary support structure and the auxiliary support structure.

5. A vehicle seat according to claim 1 wherein the energy-absorbing structure includes a plurality of energy-absorbing elements supporting the auxiliary support structure from the primary support structure in an energy-absorbing manner.

6. A vehicle seat according to claim 5 wherein the relative positions of the plurality of energy-absorbing elements can be changed with respect to each other.

7. A vehicle seat according to claim 1 wherein the energy absorbing structure includes at least one energy-absorbing element for which the force travel characteristic can be adjusted.

8. A vehicle seat according to claim 7 wherein the adjustable force-travel characteristic of the at least one energy-absorbing element can be set according to a characteristic of an occupant of the seat.

9. A vehicle seat according to claim 7 wherein the force-travel characteristic can be set as a function of one inclination angle of a backrest part of the vehicle seat.

10. A vehicle seat according to claim 1 wherein the auxiliary support structure overlaps at least 60% of an area which is enclosed by the corresponding primary support structure.

11. A vehicle seat according to claim 10 wherein the auxiliary support structure overlaps at least 80% of an area which is enclosed by the corresponding primary support structure.

12. A vehicle seat according to claim 1 including:
    an adjustable head restraint;
    control means for adjusting at least one of the height and the inclination of the head restraint;
    sensing means for sensing a seat occupant specific characteristic; and
    actuating means for changing the position of at least one of an individual energy-absorbing element in the energy absorbing structure and the adjustable head restraint.

13. A vehicle seat according to claim 12 wherein a characteristic diagram is stored in the control means containing specific arrangements for at least one energy-absorbing element for selected head restraint settings.

14. A vehicle seat according to claim 1 wherein the cushion contains a cushion spring arrangement fastened to the second framework.

15. A vehicle seat according to claim 1 wherein the auxiliary support structure has the shape of a shell body.

16. A vehicle seat according to claim 15 wherein the shell body comprises a cellular structure.

17. A vehicle according to claim 16 wherein the cellular structure comprises a polymer particle foam structure.

18. A vehicle seat according to claim 17 wherein the cellular structure comprises a rigid polypropylene or polyethylene foam structure with a density in the range from 50–90 grams per liter.

19. A vehicle seat according to claim 16 wherein the shell body comprises a cellular aluminum structure.

20. A vehicle seat according to claim 1 wherein the energy-absorbing structure comprises at least one latch member having latch teeth affixed to the auxiliary support structure and a mating latch member affixed to the corresponding primary support structure.

21. A vehicle seat according to claim 20 wherein the latch teeth and the mating latch member are matched to each other so that an increasing displacement of the auxiliary support structure relative to the primary support structure results in an force-travel characteristic.

22. A vehicle seat according to claim 1 wherein the cushion is formed around the primary support structure.

23. A vehicle seat according to claim 1 including a head restraint which is mounted on the primary support structure of the backrest part.

24. A vehicle seat comprising a seat part and a backrest part, each of the seat part and backrest part having a primary support structure and a cushion covering the primary support structure, the primary support structure of the backrest part being connected at a lower end to a rear end of the primary support structure of the seat part, at least one of the primary support structures having an associated auxiliary support structure spaced from it on a side facing a seated passenger, and at least one energy absorbing structure connecting the associated auxiliary support structure with the corresponding primary support structure, the energy-absorbing structure being plastically deformable by action of forces resulting from an impact to reduce the spacing between the primary support structure and the auxiliary support structure:

wherein the energy-absorbing structure includes a plurality of energy-absorbing elements supporting the auxiliary support structure from the primary support structure in an energy-absorbing manner; and wherein the energy-absorbing elements have different force-travel characteristics.

25. A vehicle seat comprising a seat part and a backrest part, each of the seat part and backrest part having a primary support structure and a cushion covering the primary support structure, the primary support structure of the backrest part being connected at a lower end to a rear end of the primary support structure of the seat part, at least one of the primary support structures having an associated auxiliary support structure spaced from it on a side facing a seated passenger, and at least one energy absorbing structure connecting the associated auxiliary support structure with the corresponding primary support structure, the energy-absorbing structure being plastically deformable by action of forces resulting from an impact to reduce the spacing between the primary support structure and the auxiliary support structure:

including an adjustable head restraint mounted at an upper region of the primary support structure of the backrest part and displacing means for displacing the lower end of the head restraint in response to energy-absorbing displacement of an auxiliary support structure of the backrest part.

26. A vehicle seat according to claim 25 wherein the displacing means includes an actuating linkage responsive to motion of the auxiliary support portion of the backrest part toward the corresponding primary support portion to move the head restraint in the direction of a seat occupant.

27. A vehicle seat according to claim 26 wherein the actuating linkage comprises a lever element which is mounted on the primary support structure and is associated at one end to the corresponding auxiliary support structure and at the other end to the head restraint.

* * * * *